United States Patent
Ma et al.

(10) Patent No.: US 9,920,277 B2
(45) Date of Patent: Mar. 20, 2018

(54) CONCENTRATED METALWORKING FLUID AND METALWORKING PROCESS

(71) Applicant: Dow Global Technologies LLC, Midland, MI (US)

(72) Inventors: Jiangbo Ma, Shanghai (CN); Martin R. Greaves, Baar (CH); Zhouwei Yu, Beijing (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/647,538

(22) PCT Filed: Dec. 12, 2012

(86) PCT No.: PCT/CN2012/086405
§ 371 (c)(1),
(2) Date: May 27, 2015

(87) PCT Pub. No.: WO2014/089766
PCT Pub. Date: Jun. 19, 2014

(65) Prior Publication Data
US 2015/0284657 A1  Oct. 8, 2015

(51) Int. Cl.
*C10M 173/00* (2006.01)
*C10M 169/04* (2006.01)
*C10M 173/02* (2006.01)
*C08L 71/02* (2006.01)

(52) U.S. Cl.
CPC ......... *C10M 169/044* (2013.01); *C08L 71/02* (2013.01); *C10M 173/02* (2013.01); *C08L 2205/02* (2013.01); *C10M 2207/046* (2013.01); *C10M 2209/103* (2013.01); *C10M 2209/104* (2013.01); *C10M 2209/105* (2013.01); *C10M 2209/108* (2013.01); *C10N 2240/40* (2013.01); *C10N 2240/401* (2013.01); *C10N 2240/402* (2013.01); *C10N 2270/02* (2013.01); *Y10T 29/4998* (2015.01)

(58) Field of Classification Search
CPC ............ C10N 2040/20; C10N 2040/22; C10N 2240/40; C10N 2240/401; C10M 173/00
USPC .............................................. 72/42; 508/579
See application file for complete search history.

(56) References Cited

U.S. PATENT DOCUMENTS

| 2,825,693 | A |   | 3/1958 | Beaubien et al. | |
|---|---|---|---|---|---|
| 4,491,526 | A | * | 1/1985 | Deck | C10M 173/02 252/78.5 |
| 4,825,939 | A | * | 5/1989 | Salyer | C09K 5/063 165/10 |
| 4,828,735 | A | * | 5/1989 | Minagawa | C08G 65/26 508/507 |
| 5,580,845 | A | * | 12/1996 | Ruane | C10M 169/04 508/161 |
| 6,602,834 | B1 | * | 8/2003 | Ward | C10M 169/045 508/506 |
| 7,018,959 | B2 | * | 3/2006 | McCullough | C10M 173/02 508/250 |
| 7,179,769 | B2 | * | 2/2007 | Sunkara | C10M 107/34 508/579 |
| 7,456,138 | B2 | * | 11/2008 | Sherman | C08G 65/2609 508/513 |
| 8,742,149 | B2 | * | 6/2014 | Kanetani | C10M 107/34 554/213 |
| 8,969,271 | B2 | * | 3/2015 | Greaves | C10M 107/34 508/579 |
| 9,057,038 | B2 | * | 6/2015 | Greaves | C10M 169/04 |
| 9,273,266 | B2 | * | 3/2016 | Greaves | C10M 169/04 |
| 2005/0020457 | A1 | * | 1/2005 | Rohrbach | C10M 169/04 508/478 |
| 2007/0010406 | A1 |   | 1/2007 | Okamoto et al. | |
| 2007/0167336 | A1 | * | 7/2007 | Combs | C08G 65/2663 508/577 |
| 2007/0191647 | A1 | * | 8/2007 | Poellmann | C08G 65/2609 568/866 |
| 2010/0286217 | A1 | * | 11/2010 | Annis | A01N 25/02 514/372 |
| 2012/0058924 | A1 | * | 3/2012 | Kitamura | C10M 173/02 508/507 |

(Continued)

FOREIGN PATENT DOCUMENTS

CN   102010778   4/2011
EP   1808475   7/2007

(Continued)

OTHER PUBLICATIONS

PCT/CN2012/086405 International Search Report and Written Opinion dated Sep. 19, 2013, 9 pages.

(Continued)

*Primary Examiner* — Ellen M McAvoy
(74) *Attorney, Agent, or Firm* — Brooks, Cameron & Huebsch, PLLC

(57) ABSTRACT

A concentrated metalworking fluid comprising from 60 to 90 percent by weight base oil selected from the group consisting of water soluble polyalkylene glycols, methoxypolyethylene glycols, polyethylene glycols, and combinations of two or more thereof; from 5 to 20 percent by weight glycol ether; from 0.01 to 5 percent by weight oil soluble polyalkylene glycol; and from 0.2 to 6 percent by weight one or more additives selected from the group consisting of antiweld agents, corrosion inhibitors, extreme pressure additives, buffers, biocides, lubricity additives, and combinations of two or more thereof is provided. Further provided is a metalworking process.

11 Claims, No Drawings

(56) References Cited

U.S. PATENT DOCUMENTS

| | | | |
|---|---|---|---|
| 2014/0303053 A1* | 10/2014 | Greaves | C10M 169/04 508/282 |
| 2016/0060561 A1* | 3/2016 | Greaves | C10M 169/041 508/579 |
| 2016/0068780 A1* | 3/2016 | Greaves | C10M 145/36 508/579 |

FOREIGN PATENT DOCUMENTS

| | | |
|---|---|---|
| GB | 721526 | 1/1955 |
| JP | S50-001475 | 1/1975 |
| JP | S55-118998 | 9/1980 |
| JP | 2007238713 | 9/2007 |
| WO | 9715643 | 5/1997 |
| WO | 2005113640 | 12/2005 |
| WO | 2011011656 | 1/2011 |

OTHER PUBLICATIONS

PCT/CN2012/086405 International Preliminary Report on Patentability dated Jun. 25, 2015, 6 pages.
Extended European Search Report for related European Paten Application No. 12889807.9, dated Apr. 13, 2016 (6 pgs).

* cited by examiner

CONCENTRATED METALWORKING FLUID AND METALWORKING PROCESS

FIELD OF INVENTION

The instant invention relates to a concentrated metalworking fluid and metalworking process.

BACKGROUND OF THE INVENTION

The market for metalworking fluids, including forming fluids, protecting fluids, removal fluids and treating fluids, is growing and is associated with the development of the transportation industry, metal fabrication industry, machinery, primary ferrous products, and primary aluminum products.

There are four major types of metal working fluids: straight oil based products, soluble oils, semi-synthetic oils and synthetic metal working fluids. The latter three are all water based fluids. Among these four types of metal working fluids, synthetic metal working fluids are growing, at the expense of straight-oil-based products and soluble oils. In addition to other factors such as improved technologies, enhanced environmental requirements and the installation of new equipments, the increased application of high-speed cutting technology and the continuous rise of crude oil prices are the two major driving factors leading to growth of water based metalworking fluids. This is especially the case for green-field investments.

Water based synthetic metal working fluids have been known for many years. These typically contain 90-99% water and include performance boosting additives. These fluids provide excellent cooling capacity and in many cases good lubrication such that the metal parts that are machined have good surface finishes and tool life is considered good. However it is widely acknowledged that water based fluids often do not have the excellent lubrication properties that straight oil based products can have. Furthermore they can be prone to causing ferrous corrosion due to their high water content if they are not adequately protected with corrosion inhibitors. Many efforts have been focused on the development of new additives for synthetic metal working fluids. One area of exploration is in new foam control additives. Foam control is an increasingly important performance need since machining speeds in the production engineering industry continue to increase resulting in higher fluid turbulence and air ingress into the fluid. Polyalkylene glycols have been used as foam control additives in water based metalworking fluids and these tend to be block or reverse block copolymers based on ethylene oxide and propylene oxide. One example is Pluronic PE6100 from BASF.

SUMMARY OF THE INVENTION

The instant invention is a concentrated metalworking fluid and metalworking process.

In one embodiment, the instant invention provides a concentrated metalworking fluid comprising from 60 to 90 percent by weight base oil selected from the group consisting of water soluble polyalkylene glycols, methoxypolyethylene glycols, polyethylene glycols, and combinations of two or more thereof; from 5 to 20 percent by weight glycol ether; from 0.01 to 5 percent by weight oil soluble polyalkylene glycol; and from 0.2 to 6 percent by weight one or more additives selected from the group consisting of anti-weld agents, corrosion inhibitors, extreme pressure additives, buffers, biocides, lubricity additives, and combinations of two or more thereof.

DETAILED DESCRIPTION OF THE INVENTION

The instant invention is a concentrated metalworking fluid and metalworking process.

The concentrated metalworking fluid according to the present invention comprises from 60 to 90 percent by weight base oil selected from the group consisting of water soluble polyalkylene glycols, methoxypolyethylene glycols, polyethylene glycols, and combinations of two or more thereof; from 5 to 20 percent by weight glycol ether; from 0.01 to 5 percent by weight oil soluble polyalkylene glycol; and from 0.2 to 6 percent by weight one or more additives selected from the group consisting of anti-weld agents, corrosion inhibitors, extreme pressure additives, buffers, biocides, lubricity additives, and combinations of two or more thereof.

In an alternative embodiment, the instant invention further provides a metalworking process which comprises providing a metal article; subjecting the metal article to one or more of finishing, tooling, cutting, grinding, polishing, shaping, forming or bending processes; and applying a metal working fluid onto at least a portion of the metal article, wherein the metalworking fluid comprises from 75 to 99 percent by weight water and from 25 to 1 percent by weight concentrated metalworking fluid, wherein the concentrated metalworking fluid comprises from 60 to 90 percent by weight base oil selected from the group consisting of water soluble polyalkylene glycols, methoxypolyethylene glycols, polyethylene glycols, and combinations of two or more thereof; from 5 to 20 percent by weight glycol ether; from 0.01 to 5 percent by weight oil soluble polyalkylene glycol; and from 0 to 6 percent by weight one or more additives selected from the group consisting of anti-weld agents, corrosion inhibitors, extreme pressure additives, buffers, biocides, lubricity additives, and combinations of two or more thereof.

The concentrated metalworking fluid comprises from 60 to 90 percent by weight base oil. All individual values and subranges 60 to 90 percent by weight are included herein and disclosed herein; for example, the amount of base oil can be from a lower limit 60, 65, 70, 75, 80 or 85 percent by weight to an upper limit of 64, 69, 74, 79, 84, 89 or 90 percent by weight. For example, the amount of base oil may be in the range of from 60 to 90 percent by weight, or in the alternative, the amount of base oil may be in the range of from 60 to 75 percent by weight, or in the alternative, the amount of base oil may be in the range of from 75 to 90 percent by weight, or in the alternative, the amount of base oil may be in the range of from 68 to 78 percent by weight, or in the alternative, the amount of base oil may be in the range of from 70 to 80 percent by weight.

The base oil is selected from the group consisting of water soluble polyalkylene glycols, methoxy-capped polyethylene glycols, polyethylene glycols, and combinations of two or more thereof. Water soluble polyalkylene glycols include, for example, those sold under the tradenames UCON 50HB-170, UCON 50HB 260, and UCON 75H450 which are commercially available from The Dow Chemical Company. Other water soluble polyalkylene glycols useful in the invention include water soluble polyethylene glycols, including those commercially available from The Dow Chemical Company under the tradenames CARBOWAX PEG-200, CARBOWAX PEG-300, and CARBOWAX PEG-400. One exemplary methoxy-capped polyethylene glycol which may be used in an embodiment of the invention is CARBOWAX MPEG-350 commercially available from The Dow Chemical Company.

The concentrated metalworking fluid comprises from 5 to 20 percent by weight glycol ether. All individual values and subranges 5 to 20 percent by weight are included herein and disclosed herein; for example, the amount of glycol ether can be from a lower limit of 5, 8, 11, 14, 17 or 19 percent by weight to an upper limit of 6, 9, 12, 15, 18 or 20 percent by weight. For example, the amount of glycol ether may be in the range of from 5 to 20 percent by weight, or in the alternative, amount of glycol ether may be in the range of from 5 to 16 percent by weight, or in the alternative, the amount of glycol ether may be in the range of from 12 to 20 percent by weight, or in the alternative, the amount of glycol ether may be in the range of from 8 to 18 percent by weight, or in the alternative, the amount of glycol ether may be in the range of from 5 to 10 percent by weight.

Glycol ethers useful in certain embodiments of the invention include those commercially available from The Dow Chemical Company under the tradenames DOWANOL DPNP Glycol Ether, DOWANOL TPM Glycol Ether, DOWANOL PNB Glycol Ether, and DOWANOL TPNB Glycol Ether.

The concentrated metalworking fluid comprises from 0.01 to 5 percent by weight oil soluble polyalkylene glycol. All individual values and subranges from 0.01 to 5 percent by weight are included herein and disclosed herein; for example, the amount of oil soluble polyalkylene glycol can be from a lower limit of 0.01, 0.1, 1, 1.5, 2, 2.51, 3, 3.7, 4, or 4.75 percent by weight to an upper limit of 0.05, 0.4, 1.6, 2.3, 3, 3.9, 4.45, or 5 percent by weight. For example, the amount of oil soluble polyalkylene glycol may be in the range of from 0.01 to 5 percent by weight, or in the alternative, the amount of oil soluble polyalkylene glycol may be in the range of from 0.01 to 2.45 percent by weight, or in the alternative, the amount of oil soluble polyalkylene glycol may be in the range of from 2.45 to 5 percent by weight or in the alternative, the amount of oil soluble polyalkylene glycol may be in the range of from 0.1 to 2.5 percent by weight or in the alternative, the amount of oil soluble polyalkylene glycol may be in the range of from 1 to 3.5 percent by weight.

Oil soluble polyalkylene glycols useful in embodiments of the concentrated metalworking fluid and metalworking process include any polyalkylene glycol which exhibits miscibility in API (American Petroleum Institute) Group I, mineral oils at weight percent levels from 10/90 to 90/10 oil soluble polyalkylene glycol/mineral oil. Commercially available oil soluble polyalkylene glycols include those available under the tradenames UCON OSP-18, UCON OSP-32, UCON OSP-46, UCON OSP-68, UCON OSP-150, UCON OSP-220, UCON OSP-320, UCON OSP-460, UCON OSP-680 and SYNALOX OD-80 from The Dow Chemical Company.

The concentrated metalworking fluid comprises from 0.2 to 6 percent by weight one or more additives selected from the group consisting of anti-weld agents, corrosion inhibitors, extreme pressure additives, buffers, biocides, lubricity additives, and combinations of two or more thereof, All individual values and subranges from 0.2 to 6 are included herein and disclosed herein; for example, the amount of one or more additives can be from a lower limit of 0.2, 0.5, 1.5, 2.5, 3.5, 4.5 or 5.5 percent by weight to an upper limit of 0.3, 1, 2, 3, 4, 5 or 6 percent by weight For example, the amount of one or more additives may be in the range of from 0.2 to 6 percent by weight, or in the alternative, the amount of one or more additives may be in the range of from 0.2 to 3.5 percent by weight, or in the alternative, the amount of one or more additives may be in the range of from 2.5 to 6 percent by weight, or in the alternative, the amount of one or more additives may be in the range of from 0.5 to 2.5 percent by weight.

In an alternative embodiment, the instant invention provides a concentrated metalworking fluid and metalworking process, in accordance with any of the embodiments disclosed herein, except that the base oil comprises at least one water soluble polyalkylene glycol selected from the group consisting of butanol initiated copolymers comprising units derived from ethylene oxide and propylene oxide.

In an alternative embodiment, the instant invention provides a concentrated metalworking fluid and metalworking process, in accordance with any of the embodiments disclosed herein, except that the oil soluble polyalkylene glycol is selected from the group consisting of dodecanol initiated copolymers comprising units derived from propylene oxide and butylene oxide, diol initiated butylene oxide homopolymers, and combinations of two or more thereof.

In an alternative embodiment, the instant invention provides a concentrated metalworking fluid and metalworking process, in accordance with any of the embodiments disclosed herein, except that the oil soluble polyalkylene glycol is present in an amount from 0.01 to 2.5 percent by weight.

In an alternative embodiment, the instant invention provides a concentrated metalworking fluid and metalworking process, in accordance with any of the embodiments disclosed herein, except that the oil soluble polyalkylene glycol comprises a dodecanol initiated copolymer comprising units derived from propylene oxide and butylene oxide and having a kinematic viscosity from 18 to 46 cSt at 40° C.

In an alternative embodiment, the instant invention provides a concentrated metalworking fluid and metalworking process, in accordance with any of the embodiments disclosed herein, except that the oil soluble polyalkylene glycol comprises a diol initiated butylene oxide homopolymer having a kinematic viscosity from 70 to 700 cSt at 40° C.

In an alternative embodiment, the instant invention provides a concentrated metalworking fluid and metalworking process, in accordance with any of the embodiments disclosed herein, except that the glycol ether has an auto-ignition temperature of at least 200° C. All individual values and subranges from at least 200° C. are included herein an disclosed herein; for example, the glycol ether may have an auto-ignition temperature from a lower limit of 200, 210, 220, 230, 240 or 250° C.

In an alternative embodiment, the instant invention provides a concentrated metalworking fluid and metalworking process, in accordance with any of the embodiments disclosed herein, except that the glycol ether has at least 4 percent by weight solubility in water.

In an alternative embodiment, the instant invention provides a concentrated metalworking fluid and metalworking process, in accordance with any of the embodiments disclosed herein, except that the base oil is present in an amount from 65 to 85 percent by weight, the glycol ether is present in an amount from 10 to 15 percent by weight, and the oil soluble polyalkylene glycol is present in an amount from 0.01 to 2.5 percent by weight.

In an alternative embodiment, the instant invention provides a metalworking process, in accordance with any of the embodiments disclosed herein, except that the oil soluble polyalkylene glycol is present in the metalworking fluid in an amount from 100 to 2000 ppm.

In an alternative embodiment, the instant invention further provides a metalworking process wherein the metalworking fluid comprises from 75 to 99 percent by weight water and from 25 to 1 percent by weight concentrated metalworking fluid. All individual values and subranges from 75 to 99 percent by weight water are included herein and disclosed herein; for example, the amount of water can range from a lower limit of 75, 80, 85, 90, or 95 percent by weight to an upper limit of 76, 81, 86, 91, 96 or 99 percent by weight. For example, the amount of water can range from 75 to 99 percent by weight, or in the alternative, the amount of water can range from 77 to 95 percent by weight, or in the alternative, the amount of water can range from 75 to 85 percent by weight, or in the alternative, the amount of water can range from 85 to 99 percent by weight, or in the alternative, the amount of water can range from 80 to 90 percent by weight. All individual values and subranges from 1 to 25 percent by weight concentrated metalworking fluid are included herein and disclosed herein; for example, the amount of concentrated metalworking fluid can range from a lower limit of 1, 6, 11, 16, or 21 percent by weight to an upper limit of 2, 7, 12, 17, 22 or 25 percent by weight. For example, the amount of concentrated metalworking fluid can range from 1 to 25 percent by weight, or in the alternative, the amount of concentrated metalworking fluid can range from 23 to 5 percent by weight, or in the alternative, the amount of concentrated metalworking fluid can range from 15 to 25 percent by weight, or in the alternative, the amount of concentrated metalworking fluid can range from 1 to 15 percent by weight, or in the alternative, the amount of concentrated metalworking fluid can range from 10 to 20 percent by weight.

In yet another alternative embodiment, the present invention provides a concentrated metalworking fluid consisting essentially of from 60 to 90 percent by weight base oil selected from the group consisting of water soluble polyalkylene glycols, methoxypolyethylene glycols, polyethylene glycols, and combinations of two or more thereof; from 5 to 20 percent by weight glycol ether; from 0.01 to 5 percent by weight oil soluble polyalkylene glycol; and from 0.2 to 6 percent by weight one or more additives selected from the group consisting of anti-weld agents, corrosion inhibitors, extreme pressure additives, buffers, biocides, lubricity additives, and combinations of two or more thereof.

In another alternative embodiment, the instant invention further provides a metalworking process which comprises providing a metal article; subjecting the metal article to one or more of finishing, tooling, cutting, grinding, polishing, shaping, forming or bending processes; and applying a metal working fluid onto at least a portion of the metal article, wherein the metalworking fluid comprises from 75 to 95 percent by weight water and from 25 to 5 percent by weight concentrated metalworking fluid, wherein the concentrated metalworking fluid consists essentially of from 60 to 90 percent by weight base oil selected from the group consisting of water soluble polyalkylene glycols, methoxypolyethylene glycols, polyethylene glycols, and combinations of two or more thereof; from 5 to 20 percent by weight glycol ether; from 0.01 to 5 percent by weight oil soluble polyalkylene glycol; and from 0 to 6 percent by weight one or more additives selected from the group consisting of anti-weld agents, corrosion inhibitors, extreme pressure additives, buffers, biocides, lubricity additives, and combinations of two or more thereof.

EXAMPLES

The following examples illustrate the present invention but are not intended to limit the scope of the invention.

Table 1 provides the compositions and foam decay times for each of Comparative Example (Comp. Ex.) 1 and Inventive Examples (Inv. Ex.) 1-2. Table 2 provides the compositions and foam decay times for each of Comparative Examples 2-5 and Inventive Examples 2-3.

CARBOWAX MPEG-350 is a methoxy capped polyethylene glycol having a molecular weight of 350 g/mole and is commercially available from The Dow Chemical Company.

DOWANOL DPNP Glycol Ether is dipropylene glycol mono-propylether with an average molecular weight=176 g/mole. It has a solubility in water of 15 wt % at 25° C. and is commercially available from The Dow Chemical Company.

DOWFAX DF-142, is an alcohol initiated Ethylene Oxide/Propylene Oxide reverse block copolymer with a 1% aqueous cloud point of 10° C. and is commercially available from The Dow Chemical Company.

DOWFAX DF-111 is a glycerine initiated Ethylene Oxide/Propylene Oxide reverse block copolymer with a 1% aqueous cloud point of 20.5° C. and is commercially available from The Dow Chemical Company.

DOWFAX DF-107 is an Ethylene Oxide/Propylene Oxide reverse block copolymer, with a 1% aqueous cloud point of 22° C. and is commercially available from The Dow Chemical Company.

UCON OSP 32 is an oil soluble polyalkylene glycol. It is an alcohol initiated propylene oxide/butylene oxide copolymer having a kinematic viscosity of 32 cSt at 40° C. and is commercially available from The Dow Chemical Company.

SYNALOX OD-80 is an oil soluble polyalkylene glycol. It is a butylene oxide homopolymer having a kinematic viscosity of 80 cSt at 40° C. and is commercially available from The Dow Chemical Company.

Phosphate esters were used as a lubricity additive and alkanolamines were used to adjust pH.

TABLE 1

| Component | Comp. Ex. 1 | Inv. Ex. 1 | Inv. Ex. 2 | Inventive Example 3 | Inventive Example 4 |
|---|---|---|---|---|---|
| CARBOWAX MPEG-350 | 88% | 87.5% | 87.5% | 88.3% | 88.3% |
| DOWANOL DPNP | 10% | 10% | 10% | 10% | 10% |
| DOWFAX DF-142 | 0.5% | | | | |
| UCON OSP-32 | | 1% | | 0.2% | |
| SYNALOX OD-80 | | | 1% | | 0.2% |
| Phosphate ester and Alkanolamines | 1.5% | 1.5% | 1.5% | 1.5% | 1.5% |
| Foam Decay Time, seconds | 180 | 70 | 80 | 100 | 100 |

TABLE 2

| Component | Comp. Ex. 2 | Comp. Ex. 3 | Comp. Ex. 4 | Comp. Ex. 5 | Inv. Ex. 3 | Inv. Ex. 4 |
|---|---|---|---|---|---|---|
| CARBOWAX MPEG-350 | 88.3% | 88.3% | 88.3% | 88.3% | 88.3% | 88.3% |
| DOWANOL DPNP | 10% | 10% | 10% | 10% | 10% | 10% |
| DOWFAX DF-142 | 0.2% | | | | | |
| DOWFAX DF-123 | | 0.2% | | | | |
| DOWFAX DF-111 | | | 0.2% | | | |

TABLE 2-continued

| Component | Comp. Ex. 2 | Comp. Ex. 3 | Comp. Ex. 4 | Comp. Ex. 5 | Inv. Ex. 3 | Inv. Ex. 4 |
|---|---|---|---|---|---|---|
| DOWFAX DF-107 | | | | 0.2% | | |
| UCON OSP-32 | | | | | 0.2% | |
| SYNALOX OD-80 | | | | | | 0.2% |
| Phosphate ester and Alkanolamines | 1.5% | 1.5% | 1.5% | 1.5% | 1.5% | 1.5% |
| Foam Decay Time, seconds | 120 | 160 | 150 | 150 | 100 | 100 |

Higher and lower levels of oil soluble polyalkylene glycol defoaming agent were also tested. Such formulations are shown in Table 3.

TABLE 3

| Component | Inv. Ex. 5 | Inv. Ex. 6 | Inv. Ex. 7 | Inv. Ex. 8 |
|---|---|---|---|---|
| CARBOWAX MPEG-350 | 87.5% | 87.5% | 83.5 | 83.5 |
| DOWANOL DPNP | 10% | 10% | 10% | 10% |
| UCON OSP-32 | 0.1% | | 5% | |
| SYNALOX OD-80 | | 0.1% | | 5% |
| Phosphate ester and Alkanolamines | 1.5% | 1.5% | 1.5% | 1.5% |
| Foam Decay Time, seconds | 100 | 100 | 40 | 50 |

As discussed in the Foam Test Method description below, the Comparative and Inventive Examples are for concentrated solutions. The concentrated solutions are diluted to 10% in deionized water for Foam Testing. Thus, an anti-foam level of 0.1% in an Example equates to 100 ppm in the diluted test solution; an anti-foam level of 0.2% in an Example equates to 200 ppm in the diluted test solution; an anti-foam level of 0.5% in an Example equates to 500 ppm in the diluted test solution; an anti-foam level of 1% in an Example equates to 1000 ppm in the diluted test solution; and an anti-foam level of 5% in an Example equates to 5000 ppm in the diluted test solution.

As can be readily seen from the foregoing examples, the oil soluble polyalkylene glycol anti-foam additives show substantial improvement in the speed of foam decay.

Test Methods

Test methods include the following:
Foam Test Method 20 g of the metalworking fluid concentrate (n.b., Comparative or Inventive Example) was added to 180 g of de-ionized water in a food blender with 1250 ml capacity. The solution was stirred at ambient temperature at a rotation rate of 2000 rpm for 10 minutes to produce a foam. The solution was immediately transferred to a 500 ml graduated cylinder and the foam behavior was monitored. As the foam decays, a clear liquid phase was observed at the bottom of the graduated cylinder. The time for 20 ml clear liquid to be observed was recorded. Shorter time indicates faster foam decay and better anti-foam property.

The present invention may be embodied in other forms without departing from the spirit and the essential attributes thereof, and, accordingly, reference should be made to the appended claims, rather than to the foregoing specification, as indicating the scope of the invention.

We claim:

1. A concentrated metalworking fluid comprising:
   from 60 to 90 percent by weight base oil consisting of a methoxypolyethylene glycol;
   from 5 to 20 percent by weight dipropylene glycol mono-alkylether;
   from 0.01 to 5 percent by weight oil soluble polyalkylene glycol, wherein the oil soluble polyalkylene glycol exhibits miscibility in API (American Petroleum Institute) Group I mineral oils at weight percent levels from 10/90 to 90/10 oil soluble polyalkylene glycol/mineral oil; and
   from 0.2 to 6 percent by weight one or more additives selected from the group consisting of anti-weld agents, corrosion inhibitors, extreme pressure additives, buffers, biocides, lubricity additives, and combinations of two or more thereof.

2. The concentrated metalworking fluid according to claim 1, wherein the oil soluble polyalkylene glycol is selected from the group consisting of dodecanol initiated copolymers comprising units derived from propylene oxide and butylene oxide, diol initiated butylene oxide homopolymers, and combinations of two or more thereof.

3. The concentrated metalworking fluid according to claim 1, wherein the oil soluble polyalkylene glycol is present in an amount from 0.01 to 2.5 percent by weight.

4. The concentrated metalworking fluid according to claim 1, wherein the oil soluble polyalkylene glycol comprises a dodecanol initiated copolymer comprising units derived from propylene oxide and butylene oxide and having a kinematic viscosity from 18 to 46 eSt at 40° C.

5. The concentrated metalworking fluid according to claim 1, wherein the oil soluble polyalkylene glycol comprises a diol initiated butylene oxide homopolymer having a kinematic viscosity from 70 to 700 eSt at 40° C.

6. The concentrated metalworking fluid according to claim 1, wherein the dipropylene glycol mono-alkylether has an auto-ignition temperature of at least 200° C.

7. The concentrated metalworking fluid according to claim 1, wherein the dipropylene glycol mono-alkylether has at least 4 percent by weight solubility in water.

8. The concentrated metalworking fluid according to claim 1, wherein the base oil is present in an amount from 65 to 85 percent by weight, the glycol ether is present in an amount from 10 to 15 percent by weight, and the oil soluble polyalkylene glycol is present in an amount from 0.01 to 2.5 percent by weight.

9. A metalworking process, comprising:
   providing a metal article;
   subjecting the metal article to one or more of finishing, tooling, cutting, grinding, polishing, shaping, forming or bending processes; and
   applying a metal working fluid onto at least a portion of the metal article, wherein the metalworking fluid comprises from 75 to 99 percent by weight water and from 25 to 1 percent by weight metalworking fluid concentrate, wherein the metalworking fluid concentrate comprises from 60 to 90 percent by weight base oil consisting of a methoxypolyethylene glycol; from 5 to 20 percent by weight dipropylene glycol mono-alkylether; from 0.01 to 5 percent by weight oil soluble polyalkylene glycol, wherein the oil soluble polyalkylene glycol exhibits miscibility in API (American Petroleum Institute) Group I mineral oils at weight percent levels from 10/90 to 90/10 oil soluble polyalkylene glycol/mineral oil; and from 0 to 6 percent by weight one or more additives selected from the group consisting of antiweld agents, corrosion inhibitors, extreme pressure additives, buffers, biocides, lubricity additives, and combinations of two or more thereof.

10. The metalworking process according to claim 9, wherein the oil soluble polyalkylene glycol is selected from the group consisting of dodecanol initiated copolymers comprising units derived from propylene oxide and butylene oxide, diol initiated butylene oxide homopolymers, and combinations of two or more thereof.

11. The metalworking process according to claim 9, wherein the oil soluble polyalkylene glycol is present in the metalworking fluid in an amount from 200 to 2000 ppm.

* * * * *